United States Patent
Kao

(10) Patent No.: US 7,435,365 B2
(45) Date of Patent: Oct. 14, 2008

(54) METHOD OF FABRICATING HOLLOW FOAMED-RUBBER MEMBER

(75) Inventor: Semi Kao, Chang-Hua Hsien (TW)

(73) Assignee: Shiun Jiug Industrial Co., Ltd., Chang Hua (TW)

( * ) Notice: Subject to any disclaimer, the term of this patent is extended or adjusted under 35 U.S.C. 154(b) by 368 days.

(21) Appl. No.: 11/082,775

(22) Filed: Mar. 18, 2005

(65) Prior Publication Data
US 2006/0208380 A1    Sep. 21, 2006

(51) Int. Cl.
*B29C 44/12* (2006.01)
*B29D 23/00* (2006.01)

(52) U.S. Cl. .......... 264/46.4; 156/79; 264/50; 264/51; 264/54; 264/257; 264/573

(58) Field of Classification Search ........... 264/54, 264/257, 572, DIG. 5, 46.4, 50, 51, 573; 156/79
See application file for complete search history.

(56) References Cited

U.S. PATENT DOCUMENTS 4,071,591 A * 1/1978 Kobayashi et al. .......... 264/45.3
4,596,684 A * 6/1986 Kumasaka et al. ............ 264/54
5,667,738 A * 9/1997 Krajcir ...................... 264/45.5

* cited by examiner

*Primary Examiner*—Leo B Tentoni
(74) *Attorney, Agent, or Firm*—Troxell Law Office, PLLC

(57) ABSTRACT

A method of making a hollow foaming member is to utilize the foaming agents with various decomposition speeds or gas issued into the rubber sheet in the die while vulcanization and foaming. As a result, the foaming member made by the method of the present invention has an air cell therein.

14 Claims, 3 Drawing Sheets

METHOD OF FABRICATING HOLLOW FOAMED-RUBBER MEMBER

BACKGROUND OF THE INVENTION

1. Field of the Invention

The present invention relates generally to a method of fabricating foaming members, and more particularly to a method of fabricating hollow foamed-rubber members.

2. Description of the Related Art

Typically, the methods of fabricating a foaming member have continuous extrusion method and hot-press molding method. The continuous extrusion method is to press the molten raw plastic material into an elongated sheet, and then convey the sheet to a machine for vulcanization and foaming. The hot-press molding method is to put the plastic raw material in a die that the die heats and presses the material therein for molding. The foaming members are classified into open cell sponge and close cell sponge. Basically, the conventional foaming members are porous but have a poor softness and flexibility.

There are hollow foaming products, some of which are two foaming members attached to have a chamber therebetween. Some of the hollow foaming products are made by a specific machine that a specific device is provided to make a chamber in the foaming product. Such machine costs higher and the foaming products still have a limited softness and flexibility.

SUMMARY OF THE INVENTION

The primary objective of the present invention is to provide a method of fabricating a hollow foaming product, which has no drawback described above.

According to the objective of the present invention, a method of making a hollow foaming member comprises the steps of:

a) preparing a foaming raw material having rubber, an accelerator and foaming agents with various decomposition speeds in a predetermined ratio;

b) stirring and pressing the foaming raw material repeatedly;

c) pressing the foaming raw material to have a rubber sheet, and d) putting the rubber sheet in a cavity of a die for vulcanization and foaming to have a foaming member, in which the foaming agents have chemical reactions in different temperatures to form an air cell in the foaming member.

Another method of the present invention comprises the steps of:

a) preparing a foaming raw material having rubber, an accelerator and a foaming agent in a predetermined ratio;

b) stirring and pressing the foaming raw material repeatedly;

c) pressing the foaming raw material to have a rubber sheet, and d) putting the rubber sheet in a cavity of a die for vulcanization and foaming to have a foaming member, and issuing a predetermined gas into the cavity when vulcanization and foaming to form an air cell in the foaming member.

DETAILED DESCRIPTION OF THE INVENTION

Figure 1:
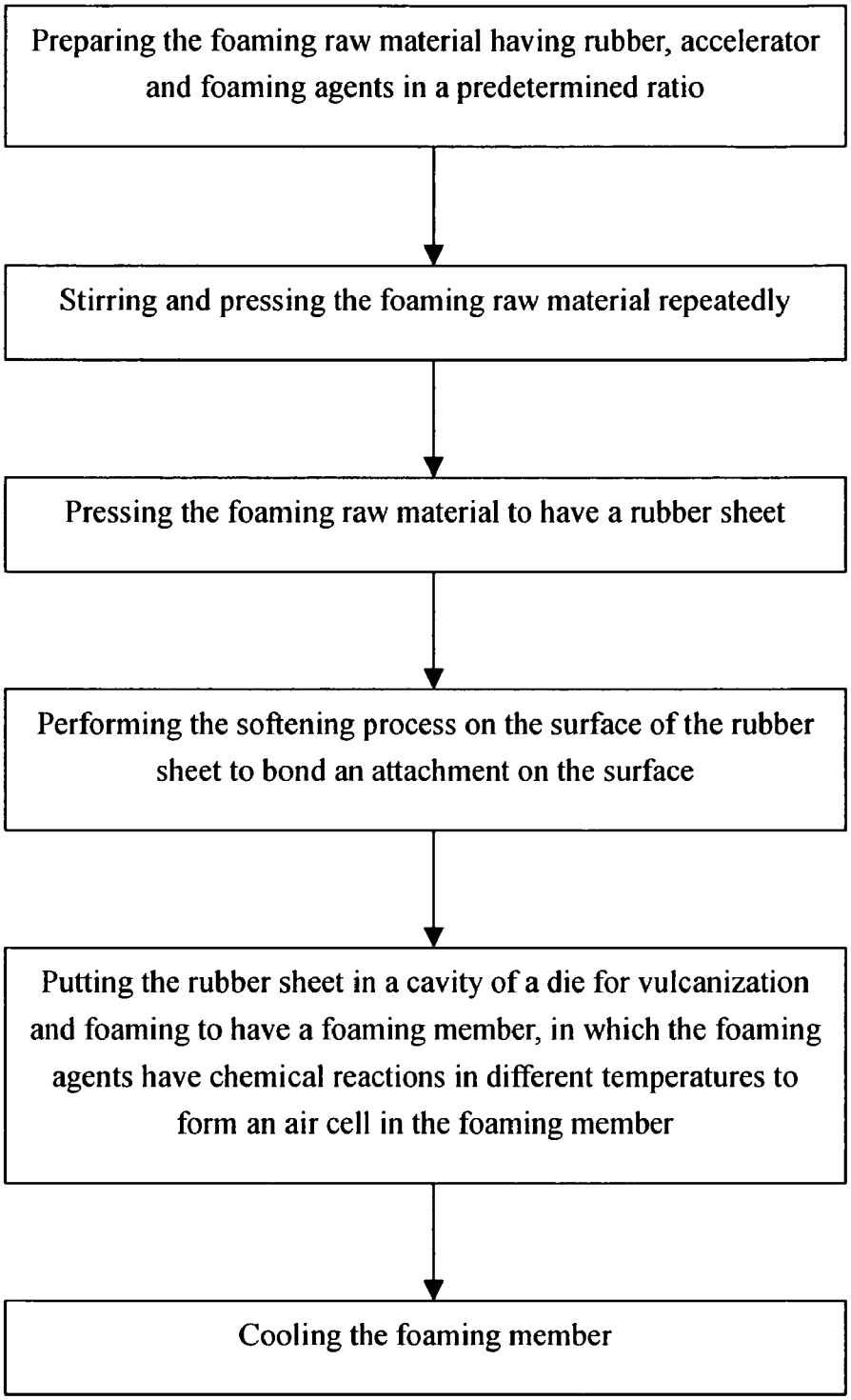
FIG. 1 is a flow chart of a first preferred embodiment of the present invention.
Figure 2:
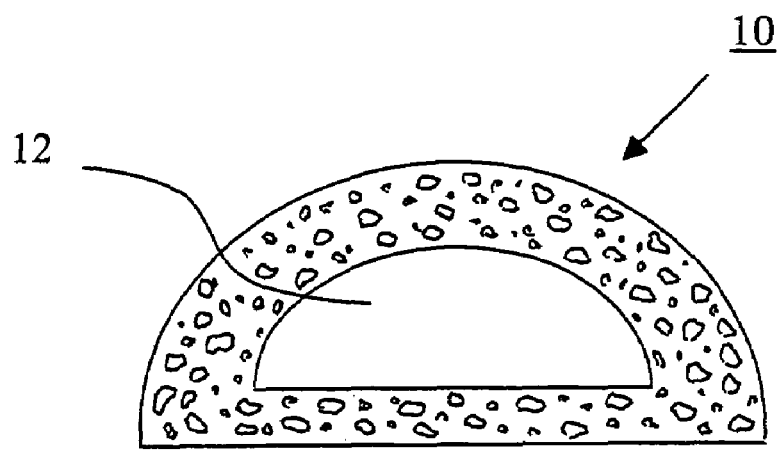
FIG. 2 is a sectional view of the foaming member made by the method of the first preferred embodiment of the present invention.

As shown in FIG. 1 and FIG. 2, a method of the first preferred embodiment of the present invention to fabricate a hollow foamed rubber member comprises the steps of:

The first step of the embodiment is to prepare a foaming raw material that has a predetermined ratio of rubber, an accelerator and foaming agents with various decomposition speeds.

The foaming raw material (i.e., a foamable raw material) has natural rubber and synthesis elastic material (e.g. Styrene Butadiene Rubber (SBR), Polybutadiene Rubber (BR) and Ethylene Propylene Terpolymer Rubber (EPDM)) in a ratio of 4:1 and a curing agent (sulfur), foaming agents of high-temperature and low-temperature, an accelerator (tetramethyl thiuram disulfide (TMTD) and 2-Mercaptobenzothiazole (MBT)) and a filler (or a reinforced agent) and an additive (rubber grade carbon black, fumed silica, $CaCO_3$ and $CaSiO_3$) to lower the cost and to improve the material properties of the rubber product. The foaming agent of high-temperature and low-temperature is Azodicarbonamide (ADCA or AC). Azodicarbonamide has high-temperature type, which decomposition temperature is 200° C., and low-temperature types, which decomposition temperature is 120° C., and generates nitrogen (65%), carbon monoxide (32%) and carbon dioxide (30%) after heating. Other foaming agents with the same function as Azodicarbonamide are applicable in the present invention also.

The second step of the embodiment is to put the foaming raw material in a machine to stir and press it repeatedly, and then send the foaming raw material to mixing machine for modification.

The third step is to press the foaming raw material into a rubber sheet. A pressing machine is incorporated in this step to press the foaming raw material into the rubber sheet.

The fourth step is to perform a softening process on surfaces of the rubber sheet, and then to lie an attachment on the surface of the rubber sheet and press it to bond the attachment on the surface of the rubber sheet. The softening process is to coat a surface softening agent on the surface of the rubber sheet, and then heat the rubber sheet to 150° C. to 250° C. for softness of the surface of the rubber sheet. The surface softening agent can utilize the conventional rubber softening agents in the process of rubber products. The attachment can be a fabric or a plastic film or rubber sheet.

The fifth step is to put the rubber sheet with the attachment in a die for vulcanization and foaming. The rubber sheet is foamed to have a rubber foaming member 10 with an air cell 12 therein by the pressure of foaming and the chemical reactions of the foaming agents at various temperatures.

The last step of the embodiment is to cool the foaming member 10 under a room temperature.

The machines for stirring and pressing, mixing and pressing for rubber sheet are the conventional devices, they are not the main characters of the present invention, so that the machines are not described the detail in the specification.

The method of the present invention provides the low temperature foaming agent to foam the rubber in low temperature, and then the high temperature foaming agent for foaming in high temperature. The gas generated in the reaction of the high temperature foaming agent is barred by the foamed rubber, such that the pressure of the gas forms an air cell in the foaming member. As a result, the quantity of the materials utilized in the process of the present invention are less than utilized in the conventional process, and the weight of the foaming member of the present invention is lighter also and the cost is reduced too. The softness of flexibility of the foaming member of the present invention is increased as well. The way of bonding the attachment on the rubber sheet is the pressure of the chemical reaction of foaming rather than glue, in other words, no glue is utilized in the method of the present invention.

Figure 4:
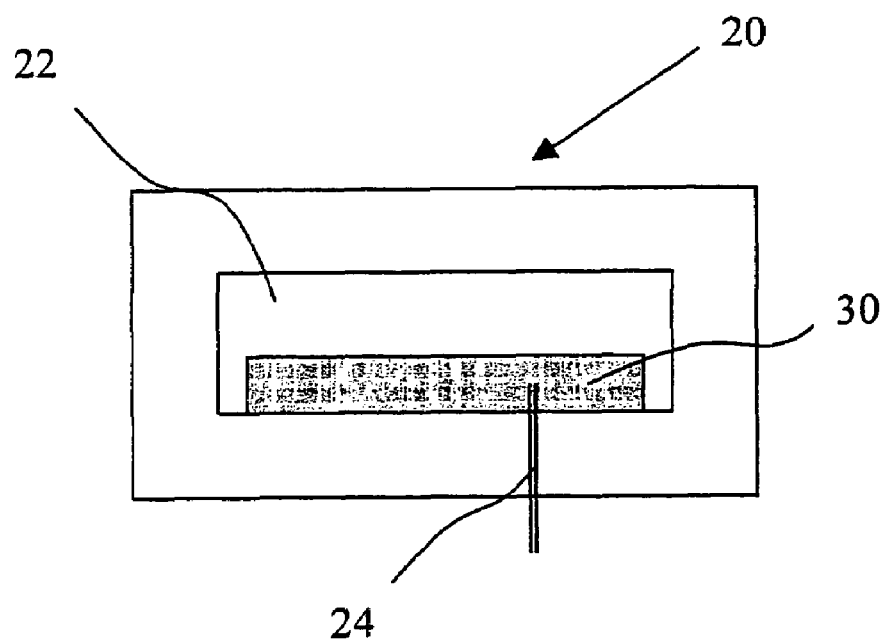
FIG. 4 is a perspective view of the die used in the method of the second preferred embodiment of the present invention.
Figure 3:
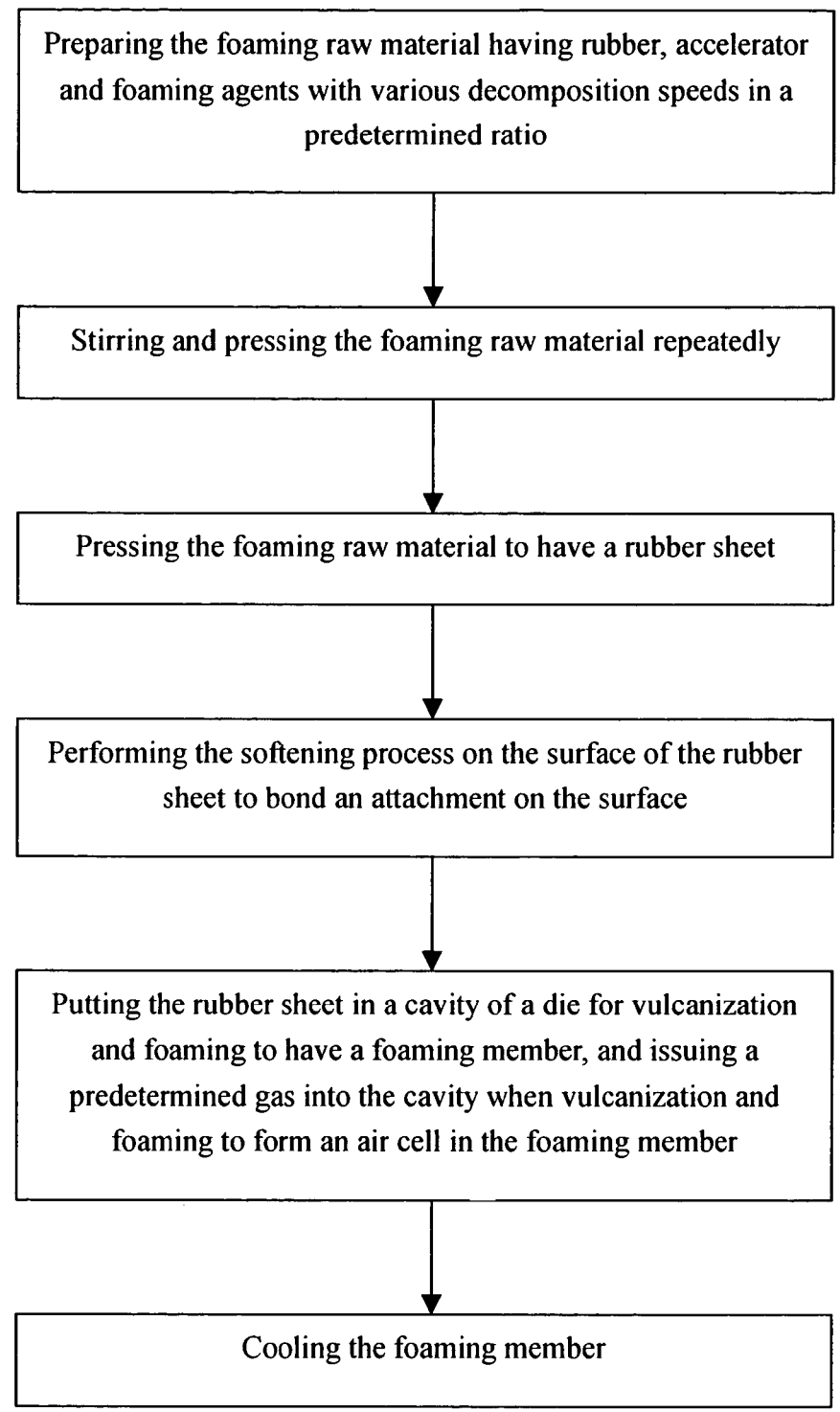
FIG. 3 is a flow chart of a second preferred embodiment of the present invention.

FIG. 3 and FIG. 4 show a method of the second preferred embodiment of the present invention, which is similar to the method of the first preferred embodiment, except that a suitable foaming agent (Azodicarbonamide (AC)) is replaced with the high-temperature and low-temperature foaming agent on the first preferred embodiment. The die 20 is provided with at least a tube 24 with an end thereof in a cavity 22 of the die 20 and inserted into the rubber sheet 30 to issue gas thereto. While in the vulcanization of the rubber sheet 30, the cavity 22 of the die 20 is issued with a suitable gas via the tube 24. The gas is trapped in the foaming member after the foaming process to form the air cell therein.

In conclusion, the present invention provides the foaming agents with various decomposition speeds to foam the raw material in the low temperature and in the high temperature. After the foaming process is completed, air cell is formed in the foaming member. The present invention also provides the tube to issue gas into the rubber sheet in the cavity of the die in the foaming process, so that the foaming member has the air cell also. The foaming member made by the method of the present invention has a lighter weight, less raw material utilized, lower cost and higher softness and flexibility.

What is claimed is:

1. A method of making a hollow foamed member, comprising the steps of: a) preparing a foamable raw material having rubber, an accelerator and foaming agents with various decomposition speeds in a predetermined ratio; b) stirring and pressing the foamable raw material repeatedly; c) pressing the foamable raw material to have a rubber sheet and; d) putting the rubber sheet in a cavity of a die for vulcanization and foaming to have a foamed member, in which the foaming agents have chemical reactions in different temperatures to form an air cell in the foaming member, the method further comprising the step of performing a softening process on a surface of the rubber sheet to soften the surface, and then lying an attachment on a surface of the rubber sheet, and then pressing the attachment to bond it on the surface of the rubber sheet between the step c) and step d).

2. The method as defined in claim 1, wherein the foamable raw material is put in a machine for stirring and pressing repeatedly, and then is put in a mixing machine for modification to mix the foamable raw material in the step b).

3. The method as defined in claim 1, wherein the softening process comprises the step of coating a softening agent on the surface of the rubber sheet.

4. The method as defined in claim 1, wherein the rubber sheet is heated to 150° C. to 250° C. for the softening process of the surface of the rubber sheet.

5. The method as defined in claim 1, wherein the attachment is a fabric.

6. The method as defined in claim 1, wherein the foaming agents have at least a high-temperature foaming agent and at least a low-temperature foaming agent.

7. The method as defined in claim 6, wherein the foaming agent is azodicarbonamide, which a decomposition temperature is about 200° C. or 120° C.

8. A method of making a hollow foamed member, comprising the steps of: a) preparing a foamable raw material having rubber, an accelerator and a foaming agent in a predetermined ratio; b) stirring and pressing the foamable raw material repeatedly; c) pressing the foamable raw material to have a rubber sheet, and d) putting the rubber sheet in a cavity of a die for vulcanization and foaming to have a foamed member, and issuing a predetermined gas into the cavity when vulcanization and foaming to form an air cell in the foaming member, the method further comprising the step of performing a softening process on a surface of the rubber sheet to soften the surface, and then lying an attachment on a surface of the rubber sheet, and then pressing the attachment to bond it on the surface of the rubber sheet between the step c) and step d).

9. The method as defined in claim 8, wherein the foamable raw material is put in a machine for stirring and pressing repeatedly, and then is put in a mixing machine for modification to mix the foamable raw material in the step b).

10. The method as defined in claim 8, wherein the softening process comprises the step of coating a softening agent on the surface of the rubber sheet.

11. The method as defined in claim 8, wherein the rubber sheet is heated to 150° C. to 250° C. for the softening process of the surface of the rubber sheet.

12. The method as defined in claim 8, wherein the attachment is a fabric.

13. The method as defined in claim 8, wherein the die is provided with a tube communicated with the cavity to issue the gas.

14. The method as defined in claim 13, wherein an end of the tube in the cavity of the die is inserted into the rubber sheet.

* * * * *